(12) United States Patent
Shishido

(10) Patent No.: US 8,051,471 B2
(45) Date of Patent: Nov. 1, 2011

(54) INFORMATION PROCESSING DEVICE, INFORMATION PROCESSING SYSTEM, COMPUTER DATA SIGNAL, COMPUTER READABLE MEDIUM, AND INFORMATION PROCESSING METHOD

(75) Inventor: Rie Shishido, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 289 days.

(21) Appl. No.: 11/755,873

(22) Filed: May 31, 2007

(65) Prior Publication Data
US 2008/0104412 A1    May 1, 2008

(30) Foreign Application Priority Data
Oct. 30, 2006  (JP) ................................ 2006-294090

(51) Int. Cl.
G06F 7/04 (2006.01)
G06F 15/16 (2006.01)
G06F 17/30 (2006.01)
H04L 29/06 (2006.01)

(52) U.S. Cl. .............. 726/6; 726/18; 713/168; 713/185; 380/59; 235/380; 340/5.8

(58) Field of Classification Search .................. None
See application file for complete search history.

(56) References Cited

U.S. PATENT DOCUMENTS

| | | | | |
|---|---|---|---|---|
| 5,157,726 A | * | 10/1992 | Merkle et al. | 713/176 |
| 5,367,150 A | * | 11/1994 | Kitta et al. | 235/380 |
| 5,619,024 A | * | 4/1997 | Kolls | 235/381 |
| 5,932,859 A | * | 8/1999 | Ijichi et al. | 235/380 |
| 6,039,412 A | * | 3/2000 | Kazo et al. | 235/437 |
| 6,362,893 B1 | * | 3/2002 | Francis et al. | 358/1.14 |
| 6,378,070 B1 | * | 4/2002 | Chan et al. | 713/155 |
| 6,862,583 B1 | * | 3/2005 | Mazzagatte et al. | 705/64 |
| 7,054,594 B2 | * | 5/2006 | Bloch et al. | 455/41.2 |
| 7,526,555 B2 | * | 4/2009 | Shahindoust | 709/227 |
| 2002/0051167 A1 | * | 5/2002 | Francis et al. | 358/1.14 |
| 2002/0083114 A1 | * | 6/2002 | Mazzagatte et al. | 709/100 |
| 2003/0066878 A1 | * | 4/2003 | Mahoney et al. | 235/380 |
| 2004/0190038 A1 | * | 9/2004 | Shahindoust | 358/1.14 |
| 2004/0235514 A1 | * | 11/2004 | Bloch et al. | 455/550.1 |

(Continued)

FOREIGN PATENT DOCUMENTS

JP   2004126998 A   4/2004

(Continued)

OTHER PUBLICATIONS

See attached machine translation of JP 2006099217 A.*

Primary Examiner — Nasser Moazzami
Assistant Examiner — Oscar Louie
(74) Attorney, Agent, or Firm — Sughrue Mion, PLLC

(57) ABSTRACT

An information processing device, comprising a reading unit that reads, from a recording medium that records information relevant to authentication, the information relevant to authentication, an acquisition unit that acquires information about a contact destination designated in association with the recording medium, when reading of the information from the recording medium by the reading unit remains continuously possible during a period of time between completion of a process instructed by a user who is authenticated based on the information recorded in the recording medium and elapse of a predetermined period of time after the completion, and a transmission unit that sends predetermined information to the contact destination specified by the acquired information.

20 Claims, 2 Drawing Sheets

U.S. PATENT DOCUMENTS

| | | | |
|---|---|---|---|
| 2005/0273493 A1* | 12/2005 | Buford et al. | 709/204 |
| 2006/0025177 A1* | 2/2006 | Tu | 455/558 |
| 2006/0077903 A1* | 4/2006 | Hiltunen | 370/252 |
| 2007/0074041 A1* | 3/2007 | Aull et al. | 713/186 |
| 2007/0093104 A1* | 4/2007 | Mouri | 439/188 |
| 2007/0123354 A1* | 5/2007 | Okada | 463/47 |
| 2007/0271603 A1* | 11/2007 | Lee et al. | 726/9 |
| 2008/0022086 A1* | 1/2008 | Ho et al. | 713/155 |
| 2008/0035725 A1* | 2/2008 | Jambunathan et al. | 235/380 |
| 2008/0260156 A1* | 10/2008 | Baba et al. | 380/277 |
| 2009/0217199 A1* | 8/2009 | Hara et al. | 715/808 |
| 2009/0245029 A1* | 10/2009 | Kam | 368/10 |

FOREIGN PATENT DOCUMENTS

| | | | |
|---|---|---|---|
| JP | 2006-004137 A | | 1/2006 |
| JP | 2006099217 A | * | 4/2006 |
| JP | 2006107376 A | | 4/2006 |
| JP | 2006217306 A | | 8/2006 |
| WO | WO 2006018874 A1 | * | 2/2006 |

\* cited by examiner

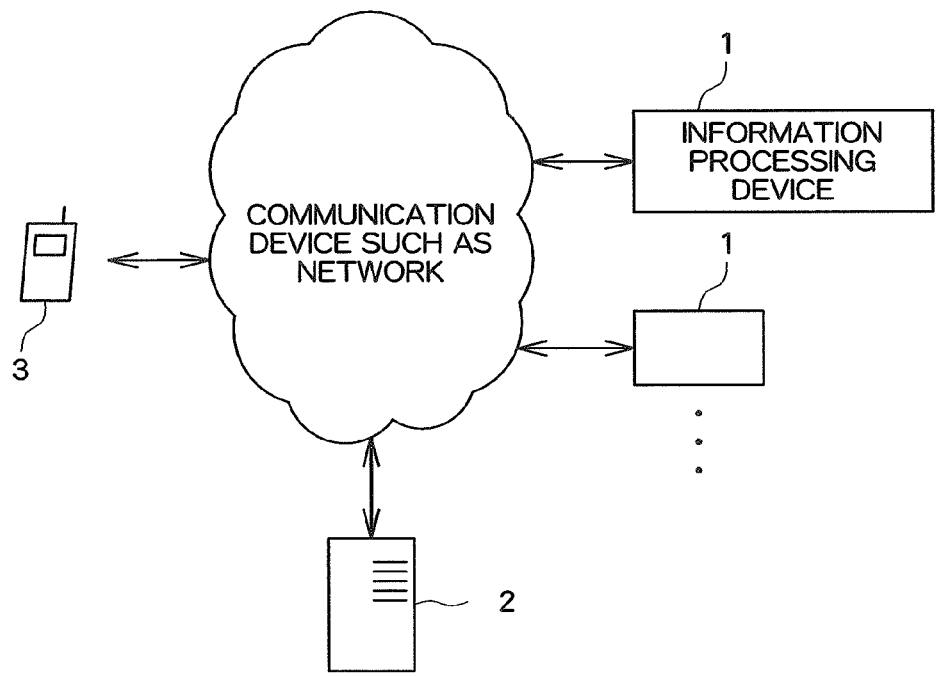
FIG.4
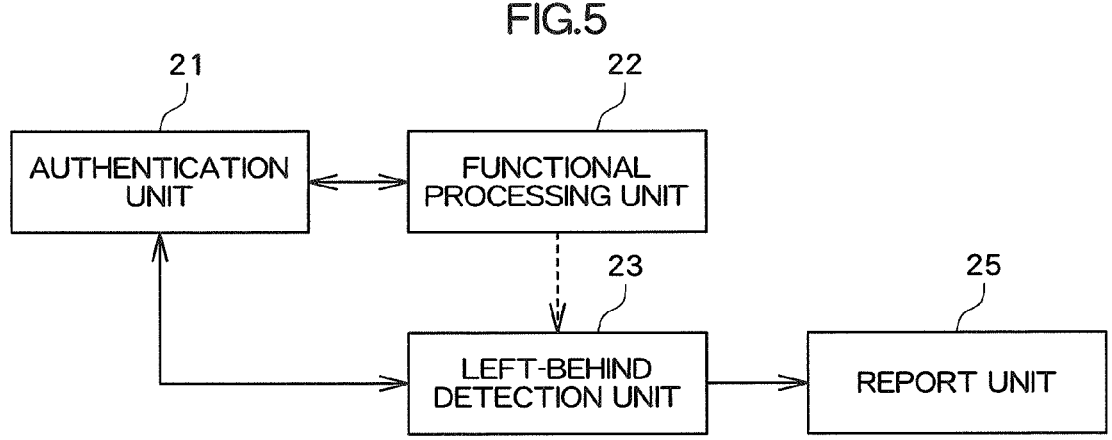
FIG.5
FIG.6
| USER IDENTIFIER | INHERENT INFORMATION | RE-ISSUANCE FREQUENCY |
|---|---|---|
| xxxx | aaaa | 2 |
| yyyy | bbbb | 1 |
| ⋮ | ⋮ | ⋮ |

INFORMATION PROCESSING DEVICE, INFORMATION PROCESSING SYSTEM, COMPUTER DATA SIGNAL, COMPUTER READABLE MEDIUM, AND INFORMATION PROCESSING METHOD

CROSS-REFERENCE TO RELATED APPLICATIONS

This application is based on and claims priority under 35 U.S.C 119 from Japanese Patent Application No. 2006-294090 filed Oct. 30, 2006.

BACKGROUND

1. Technical Field

The present invention relates to an information processing device, an information processing system, a computer data signal, a computer readable medium, and an information processing method.

2. Related Art

A system is available for authenticating a user, using a memory card or a memory medium, such as an IC card or the like, which records information. In the system using such an IC card, it is necessary to take measures against illegal use of an IC card left behind by the user. However, because of the measures, the user having lost their IC card cannot use a device until their IC card is re-issued.

SUMMARY

According to one aspect of the present invention, there is provided an information processing device comprising a reading unit that reads, from a recording medium that records information relevant to authentication, the information relevant to authentication, an acquisition unit that acquires information about a contact destination designated in association with the recording medium, when reading of the information from the recording medium by the reading unit remains continuously possible during a period of time between completion of a process instructed by a user who is authenticated based on the information recorded in the recording medium and elapse of a predetermined period of time after the completion, and a transmission unit that sends predetermined information to the contact destination specified by the acquired information.

BRIEF DESCRIPTION OF THE DRAWINGS

Exemplary embodiments of the present invention will be described in detail based on the following figures, wherein:

FIG. 4 is a structural block diagram showing an example of an information processing system in a second aspect of the embodiment of the present invention;

FIG. 5 is a functional block diagram showing an example of the information processing device according to the second aspect of the embodiment of the present invention; and FIG. 6 is a diagram explaining an example of information to be recorded in the medium management center-side device in the information process system according to the second aspect of the embodiment of the present invention.

DETAILED DESCRIPTION

Figure 1:
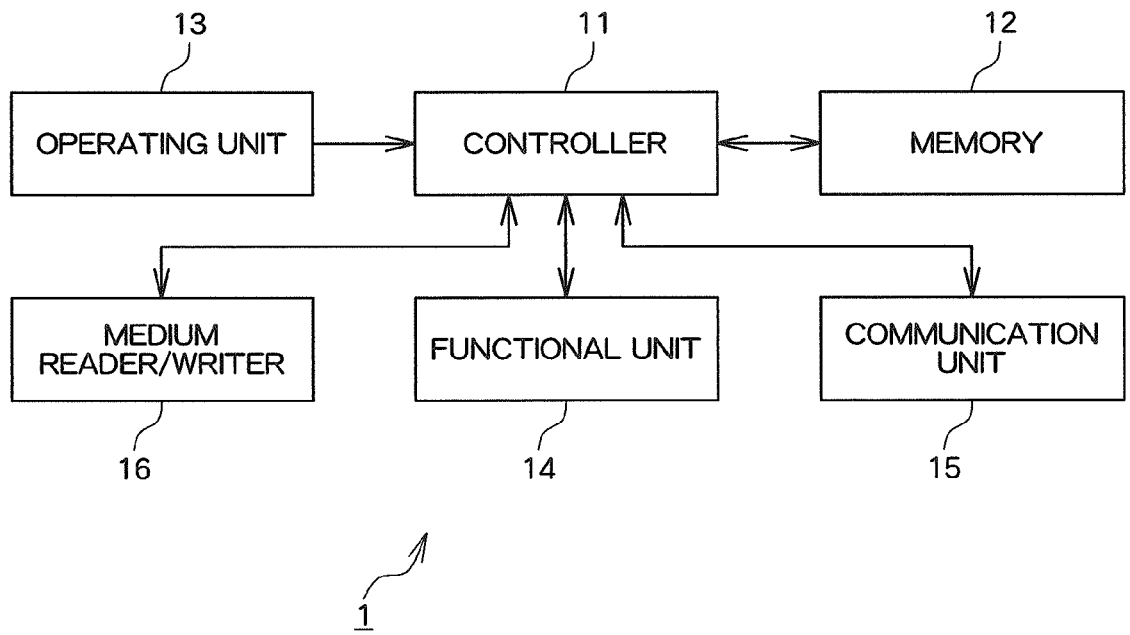
FIG. 1 is a structural block diagram showing an example of an information process device according to a first aspect of an exemplary embodiment of the present invention.

An exemplary embodiment of the present invention will be described with reference to the accompanying drawings. An information processing device 1 according to a first aspect of an exemplary embodiment of the present invention includes, as shown in FIG. 1, a controller 11, a memory 12, an operating unit 13, a functional unit 14, a communication unit 15, and a medium reader/writer 16.

The controller 11 may be a microprocessor, or the like, and operates according to a program stored in the memory 12. The controller 11 instructs the medium reader/writer 16 every predetermined time (for example, regularly) to read information stored in the recording medium, and authenticates the user using the read information.

When the user is authenticated, the controller 11 controls the functional unit 14 to carry out a process instructed via the operating unit 13. A specific process to be carried out by the controller 11 will be described later in detail.

The memory 12 includes a storage element, such as a RAM (Random Access Memory), a ROM (Read Only Memory), or the like. The memory 12 stores a program to be executed by the controller 11. The program may be presented in the form of being stored in a computer readable recording medium, such as a CD-ROM, a DVD-ROM, or the like, and copied to the memory 12. The memory 12 also operates as a work memory of the controller 11.

The operating unit 13 may be a numeric keypad, a touch panel, or the like, and receives an instruction operation by the user, and outputs the content of the operation to the controller 11.

The functional unit 14 realizes the function as the information processing device 1. In the case where the information processing device 1 mentioned here is a multifunctional peripheral device, for example, which realizes in a composite manner the functions of a copier, a scanner, a printer, or the like, the functional unit 14 includes a flat bed scanner, a laser printer, and so forth. The information processing device 1 which is an information display device, or the like, may include a display, or the like.

The communication unit 15 is connected to communication infrastructure, such as a network, a telephone network, or the like, and sends data to a designated destination via the communication infrastructure according to an instruction input from the controller 11. The communication unit 15 also outputs the data received via the communication infrastructure to the controller 11.

The medium reader/writer 16 reads information from a card-like recording medium which possesses a radio communication function, such as, for example, an RFID (Radio Frequency Identification), or the like, according to an instruction input from the controller 11, and outputs to the controller 11.

Further, according to the instruction input from the controller 11, the medium reader/writer 16 records the instructed information into a card-like recording medium which possesses a radio communication function.

Figure 2:
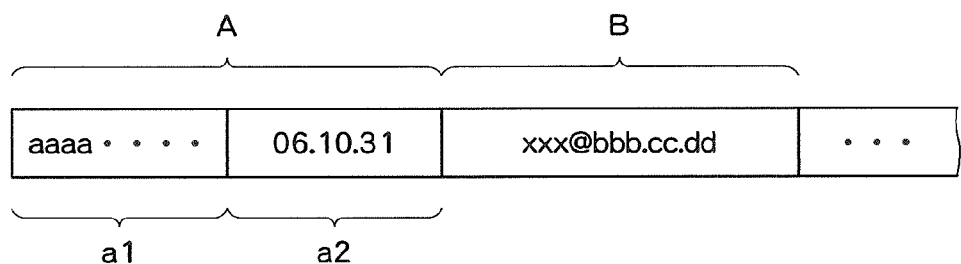
FIG. 2 is a diagram explaining an example of content of information recorded in a recording medium, which is read by the information processing device according to the exemplary embodiment of the present invention.

In the recording medium from which information is read using the medium reader/writer 16 of the information processing device 1 of this exemplary embodiment, as shown as an example in FIG. 2, information for identifying a recording medium (unique information, or the like; a1) and information about a expiration date (a2) are stored as information (A) relevant to authentication. The recording medium additionally stores, as information (B) about a contact destination, the mail address of a portable phone of a user identified by the authentication-related information.

Figure 3:
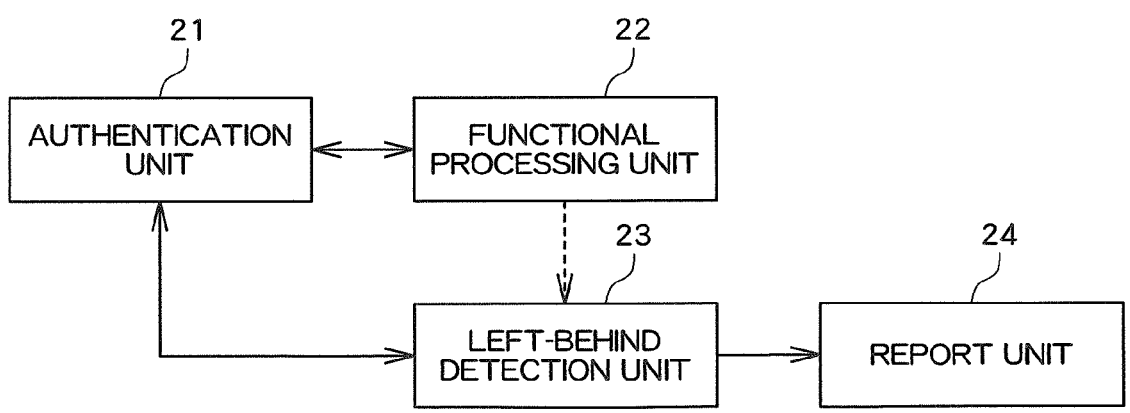
FIG. 3 is a functional block diagram showing an example of the information process device according to an aspect of the exemplary embodiment of the present invention.

Here, operation of the controller 11 in the exemplary embodiment will be described. In this exemplary embodiment, a program to be executed by the controller 11 includes, in terms of function, an authentication unit 21, a functional processing unit 22, a left-behind detection unit 23, and a report unit 24, as shown in FIG. 3.

Upon receipt of a request for authentication from the functional processing unit 22, or the like, for example, the authentication unit 21 instructs the medium reader/writer 16 to read information from a recording medium placed close thereto. Then, upon input of the information read by the medium reader/writer 16, the authentication unit 21 carries out authentication based on the input information. In the above, the authentication may be carried out, for example, through verification using unique information stored in advance in the memory 12 or using a widely known authentication technique, such as PKI (Public Key Infrastructure), or the like, with detailed description thereof not included here.

When the authentication-related information read by the medium reader/writer 16 contains information about a expiration date, the authentication unit 21 compares the expiration date information and the present time and date (time and date when the authentication is carried out), measured by a time measurement device (not shown) for measuring the present time and date, and when the expiration date is already passed, determines that authentication fails.

Meanwhile, with successfully completed authentication, the authentication unit 21 outputs information indicative of that fact to the unit having requested the authentication. When the authentication fails or no information is read from the card (when no card is placed close to the medium reader/writer 16, or the like), the authentication unit 21 outputs information indicative of an error to the unit having requested the authentication.

The functional processing unit 22, having received the content of the instruction operation carried out by the user using the operating unit 13, requests the authentication unit 21 to authenticate the user. Then, upon receipt of the information from the authentication unit 21, informing of successfully completed authentication, the functional processing unit 22 carries out a process, including control of the functional unit 14, or the like, according to the received instruction operation. For example, the functional processing unit 22 of the processing device 1 which is a multifunctional peripheral device may operate as described in the following example.

That is, suppose here that the user operates the operating unit 13 to instruct copying with their recording medium placed in contact with the medium reader/writer 16. Then, the controller 11 controls such that the functional processing unit 22 requests the authentication unit 21 to make authentication. Accordingly, the authentication unit 21 carries out authentication based on the information read by the medium reader/writer 16. With successful authentication and information output informing to that effect, the functional processing unit 22 controls the functional unit 14 according to the user instruction to output the image data read by the scanner to the printer to copy.

Upon completion of the process by the functional unit 14, the functional processing unit 22 outputs a signal indicating a completed process to the left-behind detection unit 23.

The left-behind detection unit 23 requests the authentication unit 21 every predetermined time (for example, regularly) to carry out authentication. When the information indicating successful authentication is kept received over a predetermined period, the left-behind detection unit 23 obtains contact information in the information read by the medium reader/writer 16, and outputs the obtained contact information to the report unit 24.

Here, the above-mentioned predetermined period may be the entire period during which the same authentication information is still being read (that is, a period of time with a certain recording medium remaining in contact with the medium reader/writer 16) or a period of time between receipt of a signal indicating a completed process, sent from the functional processing unit 22, and elapse of a predetermined period of time after the receipt. Here, suppose that the predetermined period is defined as a period of time between receipt of a signal indicative of a completed process, input from the functional processing unit 22, and elapse of a predetermined period of time after the receipt. In this case, the recording medium is determined as having been left behind when the recording medium is kept in contact with the medium reader/writer 16 for a predetermined period of time after the process designated by the user is completed. In other words, the recording medium is not determined as having been left behind while the process relative to the recording medium is still being carried out.

The report unit 24, having received the contact information, controls the communication unit 15 to send predetermined information by means of an electronic mail, or the like, to the input contact information. The predetermined information to be sent to the contact destination may include information relevant to authentication. In this case, information relevant to authentication (information for identifying a recording medium or a valid period) may be newly issued. For example, information for identifying a recording medium may be newly issued for replacement. The information being replaced may be invalidated (information which cannot be authenticated).

As a specific example of the process, suppose that authentication is granted based on whether or not the unique information read from the recording medium coincides with the information stored in advance as verification information. In this case, the unique information to be invalidated is deleted from the verification information, and the newly issued unique information is included in the verification information.

Also, in the case where authentication is granted while inquiring of an authentication server (not shown), the unique information to be invalidated is notified to the authentication server to inhibit authentication for the recording medium which stores the unique information. Thereafter, a request is made for registration of the newly issued unique information in the authentication server to enable authentication for the recording medium which records the newly issued unique information.

In this exemplary embodiment, a user having left an IC card, or a recording medium for authentication, in a medium reader/writer connected to a multifunctional peripheral device, or the like, which serves as the information processing device 1 receives an electronic mail, or the like, informing that an IC card has been left behind, which is sent to the destination recorded in the IC card.

When the electronic mail, or the notice, includes authentication-related information, it is possible to arrange a different IC card to be usable as a recording medium for authentication by recording the authentication-related information into the IC card.

Recently, a portable phone, a PDA (Personal Digital Assistant), and so forth, possessing a function of RFID (Radio Frequency Identification), have become available. When the above-described notice is received by such a portable phone, PDA, or the like, it is possible to arrange the portable phone or the PDA itself to be usable as a recording medium for authentication by recording the authentication-related information, contained in the notice, into the portable phone, the PDA, or the like. In this case, should software for recording or deleting, or the like, the authentication-related information in the portable phone, the PDA, or the like be necessary, the software may be additionally sent, contained in the above-described predetermined information.

When authentication information is held in a portable phone, or the like, as described above, the information processing device 1 may copy the authentication information to a different recording medium (an IC card, or the like). For example, the controller 11 having received a user instruction for copying instructs the user to place the medium (a portable phone, or the like, here) which holds the authentication information to copy in contact with the medium reader/writer 16. Then, when the user places the portable phone, or the like, which holds the authentication information to be copied, close to the medium reader/writer 16, the medium reader/writer 16 reads the authentication information, and outputs to the controller 11. The controller 11 thereby holds the authentication information, then obtains present time and date information (time and date when the process is carried out) from the time measurement unit (not shown), and determines whether or not the present time and date is before the expiration date with reference to the expiration date information of the authentication information held. When it is determined that it is before the expiration date, the controller 11 instructs the user to place a recording medium into which the information is to be copied in contact with the medium reader/writer 16. When the user, in response to the instruction, places the recording medium to which the information is to be copied close to the medium reader/writer 16, the controller 11 then instructs the medium reader/writer 16 to write the authentication information into the recording medium.

It should be noted here that, whereas the information processing device 1 itself carries out authentication and notification in the above, in the case where a management center manages the authentication information, the information processing device 1 may report leaving-behind to the management center.

That is, an information processing system according to another (second) aspect of an exemplary embodiment of the present invention includes, as shown in FIG. 4, at least one information processing device 1, a medium management center-side device 2, and a user side terminal 3, all connected to one another via a communication infrastructure, such as a network, or the like, so as to communicate with one another.

The information processing device 1 in the second aspect of the embodiment has a similar structure to that of the device above described, but the content of the processing by the controller 11 is slightly different, as will be described later.

The medium management center side device 2 is realized using a computer, such as a server device, or the like, and upon receipt of a notice about a recording medium left behind sent from the information processing device 1, obtains information about a contact destination designated in association with the recording medium. Then, the medium management center side device 2 sends predetermined information to the contact address. An example of operation of the medium management center-side device 2 will be described later in detail.

The user side terminal 3, which is a device for receiving a notice, such as an electronic mail, or the like, from the medium management center-side device 2, may be a portable device, such as a portable phone, a PDA, or the like, or a personal computer, or the like.

The controller 11 of the information processing device 1 in this aspect of the embodiment includes, in terms of function, the authentication unit 21, the functional processing unit 22, the left-behind detection unit 23, and a report unit 25, as shown in FIG. 5. Units for operations similar to above described are assigned identical reference numerals, with details thereof not described here.

In the second aspect of the embodiment, the report unit 25 operates differently from above described. That is, upon receipt of the contact information, the report unit 25 in this aspect of the embodiment controls the communication unit 15 so as to send the input contact information and the authentication-related information to the predetermined medium management center-side device 2.

In this aspect of the embodiment, the authentication unit 21 may send at least a part of the authentication-related information read by the medium reader/writer 16, for example, the unique information of the recording medium, to the medium management center-side device 2 so that the medium management center-side device 2 carries out authentication.

The medium management center side device 2 stores, as shown in FIG. 6, a user identifier (Q) unique to each user, unique information (R) of a recording medium, and a re-issuance frequency (S) in the manner of all being associated with one another. Then, when the medium management center side device 2 receives the unique information of the recording medium together with the authentication request from the information processing device 1, the medium management center side device 2 compares the received unique information and the unique information stored therein to carry out an authentication process.

The medium management center-side device 2 receives contact information and authentication-related information from the information processing device 1 having found the recording medium left behind. The medium management center-side device 2 then notifies the received contact destination of the recording medium left behind. It is assumed here that the user receives the notice at the user side terminal 3.

The medium management center-side device 2 may include contact information for use in generating a re-issuance request for a recording medium in the notice to be sent to the user side terminal 3. For example, in the structure in which the medium management center-side device 2 operates as a web server, presenting a web page for receiving a re-issuance request of a recording medium, the notice may include the URL (Uniform Resource Locator) of the web page. In this case, if the user terminal device 3 possesses a web access function, requesting the web page by designating the URL ensures a situation in which a re-issuance request of a recording medium can be made. That is, the medium management center-side device 2 receives a re-issuance request of a recording medium from the user based on the notified information.

Upon receipt of the re-issuance request, the medium management center side device 2 increments by one the re-issuance frequency, stored in association with the information for specifying the user having made the request, then invalidates the unique information of the recording medium, stored in association with the information for specifying the user having made the request, and overwrites the invalidated unique information, using the newly issued unique information, for example. It should be noted that the information for specifying a user having made the request may be encouraged to be input on the web page for receiving the above-described re-issuance request. Alternatively, the information for specifying a user (for example, unique identification information for every notice) may be contained in the URL to be sent to the user side terminal 3 so that the specifying information is held in association with the unique information to be re-issued, or the like. In the latter case, reference to the unique information to be re-issued, stored in association with the information contained in the received URL, enables specification of the user.

In the case of the user side terminal 3 which is a portable phone, a PDA, or the like, possessing a function as an RFID, the medium management center-side device 2 may newly issue authentication-related information in response to a request from the user side terminal 3, and send the issued information to the user side terminal 3 having made the request. In this case, a shorter period of validity may be set compared to the case in which the expiration date is recorded in a recording medium. Should the portable phone, the PDA, or the like, serving as the user side terminal 3, need software for recording, deleting, or the like, the authentication-related information, the medium management center-side device 2 may additionally send the software.

The medium management center-side device 2 may apply a predetermined process, including transmission of alert information, or the like, to a user having the re-issuance frequencies in excess of a predetermined threshold.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device, comprising:
an operating unit that receives an instruction of data processing by a user;
a reading unit that reads, from a recording medium, authentication information of the user;
a processing unit that controls, when authentication based on the authentication information succeeds, the information processing device to execute the data processing;
an acquisition unit that acquires, when the authentication information is continuously read from the recording medium by the reading unit for a predetermined period of time after receipt of a signal indicating that the processing unit has completed the data processing, information about a contact destination associated with the user from the recording medium;
a writing unit that writes new authentication information into an IC card by using a user's device, wherein the writing of the new authentication information comprises invalidating the authentication information and generating new authentication information of the user; and
a sending unit that sends an electronic message to the contact destination, the electronic message comprising the new authentication information and indicating to the user that the recording medium remains in a vicinity of the information processing device, in response to the acquisition unit acquiring the contact destination,
wherein the writing of the new authentication information further comprises the writing unit receiving an input of the new authentication information from the user's device that receives the electronic message and writing the new authentication information to a new recording medium.

2. The information processing device according to claim 1, wherein the electronic message includes new authentication information of the user, which identifies a new recording medium that replaces the recording medium.

3. The information processing device according to claim 1, wherein the processing unit controls the information processing device to process data to be output by the image processing device as an image and controls the image processing device to output the processed data as the image, in response to the reading unit reading the authentication information, and wherein the acquisition unit acquires, when the authentication information is continuously read from the recording medium by the reading unit for a predetermined period of time after the image processing device outputs the image, information about a contact destination associated with the user from the recording medium.

4. The information processing device according to claim 1, wherein the information about a contact destination associated with the user is an email address of the user and the electronic message is an email message sent to the email address of the user.

5. An information processing system comprising:
an information processing device; and
a medium management center-side device,
wherein the information processing device comprises:
an operating unit that receives an instruction of data processing by a user;
a reading unit that reads, from a recording medium, authentication information of the user;
a processing unit that controls, when the authentication based on the authentication information succeeds, the information processing device to execute the data processing;
a writing unit that writes new authentication information into an IC card by using a user's device, wherein the writing of the new authentication information comprises invalidating the authentication information and generating new authentication information of the user; and
a notification unit that notifies, when the authentication information is continuously read from the recording medium by the reading unit for a predetermined period of time after receipt of a signal indicating that the processing unit has completed the data processing, the medium management center-side device of information about a contact destination associated with the user from the recording medium,
wherein the medium management center-side device sends an electronic message to the contact destination, the electronic message comprising the new authentication information and indicating to the user that the recording medium remains in a vicinity of the information processing device, in response to the authentication information being read for the predetermined period of time after the processing, and
wherein the writing of the new authentication information further comprises the writing unit receiving an input of the new authentication information from the user's device that receives the electronic message and writing the new authentication information to a new recording medium.

6. The information processing system according to claim 5, wherein the electronic message includes new authentication information of the user, which identifies a new recording medium that replaces the recording medium.

7. The information processing system according to claim 5, wherein the processing unit controls the information processing device to process data to be output by the image processing device as an image and controls the image processing device to output the processed data as the image, in response to the reading unit reading the authentication information, and wherein the notification unit notifies, when the authentication information is continuously read from the recording medium by the reading unit for a predetermined period of time after the image processing device outputs the image, the medium management center-side device of information about a contact destination associated with the user from the recording medium.

8. The information processing system according to claim 5, wherein the information about a contact destination associated with the user is an email address of the user and the electronic message is an email message sent to the email address of the user.

9. A non-transitory computer readable medium storing a program causing a computer to execute a process comprising:
receiving an instruction of data processing by a user;
reading, from a recording medium, authentication information of the user;
executing the data processing when authentication based on the authentication information succeeds;
acquiring, when the authentication information is continuously read from the recording medium for a predetermined period of time after receipt of a signal indicating that the data processing has completed, information about a contact destination associated with the user from the recording medium;
invalidating the authentication information and generating new authentication information of the user;
sending an electronic message to the contact destination, the electronic message comprising the new authentication information and indicating to the user that the recording medium remains in a vicinity of the information processing device, in response to the acquiring;
receiving an input of the new authentication information from a user's device that receives the electronic message; and
writing the new authentication information to a new recording medium.

10. The non-transitory computer readable medium according to claim 9, wherein the electronic message includes new authentication information of the user, which identifies a new recording medium that replaces the recording medium.

11. The non-transitory computer readable medium according to claim 9, wherein the processing comprises processing data to be output as an image and outputting the processed data as the image, in response to reading the authentication information, and wherein the acquiring comprises acquiring, when the authentication information is continuously read from the recording medium for a predetermined period of time after the outputting, information about a contact destination associated with the user from the recording medium.

12. The non-transitory computer readable medium according to claim 9, wherein the information about a contact destination associated with the user is an email address of the user and the electronic message is an email message sent to the email address of the user.

13. An information processing method, performed using a computer connected to an information processing device that receives an instruction of data processing by a user, reads, from a recording medium, authentication information of the user, executes the data processing when authentication based on the authentication information succeeds, and when the authentication information is continuously read from the recording medium for a predetermined period of time after receipt of a signal indicating that the data processing has been completed, notifies the computer that reading of information from the recording medium remains possible, the method comprising:
acquiring information about a contact destination associated with the user;
invalidating the authentication information and generating new authentication information of the user;
sending an electronic message to the contact destination, the electronic message comprising the new authentication information and indicating to the user that the recording medium remains in a vicinity of the information processing device, in response to the acquiring;
receiving an input of the new authentication information from a user's device that receives the electronic message; and
writing the new authentication information to a new recording medium.

14. The method according to claim 13, wherein the electronic message includes new authentication information of the user, which identifies a new recording medium that replaces the recording medium.

15. The information processing method according to claim 13, wherein the information processing device reads, from the recording medium, the authentication information of the user, and when the authentication information is continuously read from the recording medium for a predetermined period of time after processing data and outputting the processed data as an image, in response to reading the authentication information, notifies the computer that reading of information from the recording medium remains possible.

16. The method according to claim 13, wherein the information about a contact destination associated with the user is an email address of the user and the electronic message is an email message sent to the email address of the user.

17. A medium management center-side device comprising:
a receiving unit that receives an instruction of data processing by a user, receives information about a contact destination of the user from an information processing device connected to the medium management center-side device that reads authentication information of the user from a recording medium, executes the data processing when authentication based on the authentication information succeeds, writes new authentication information into an IC card by using a user's device, wherein the writing of the new authentication information comprises invalidating the authentication information and generating new authentication information of the user, reads the contact destination from the recording medium when the authentication information is continuously read from the recording medium for a predetermined period of time after receipt of a signal indicating that the data processing is completed, and notifies the medium management center-side device of the contact destination in response to the authentication information being read for the predetermined period of time after the processing is completed; and a unit that issues new authentication information of the user that replaces the authentication information of the user;

a sending unit that sends an electronic message to the received contact destination, the electronic message comprising the new authentication information and indicating to the user that the recording medium remains in a vicinity of the information processing device, in response to the receiving unit receiving the contact destination, wherein the writing of the new authentication information further comprises the writing unit receiving an input of the new authentication information from the user's device that receives the electronic message and writing the new authentication information to a new recording medium.

18. The management center-side device according to claim 17, wherein the electronic message includes new authentication information of the user, which identifies a new recording medium that replaces the recording medium.

19. The medium management center-side device according to claim 17, wherein the receiving unit receives the information about a contact destination of a user from an information processing device connected to the medium management center-side device that reads authentication information of the user from the recording medium, processes data and outputs the processed data as an image, in response to the read authentication information, reads the contact destination from the recording medium when the authentication information is continuously read from the recording medium for a predetermined period of time after the image is output, and notifies the medium management center-side device of the contact destination in response to the authentication information being read for the predetermined period of time after the image is output.

20. The management center-side device according to claim 17, wherein the information about a contact destination associated with the user is an email address of the user and the electronic message is an email message sent to the email address of the user.

* * * * *